Feb. 17, 1970                B. C. ELLIS, JR., ET AL                3,496,522
                              WIRE CONNECTING BLOCKS
Filed April 28, 1967                                        7 Sheets-Sheet 1
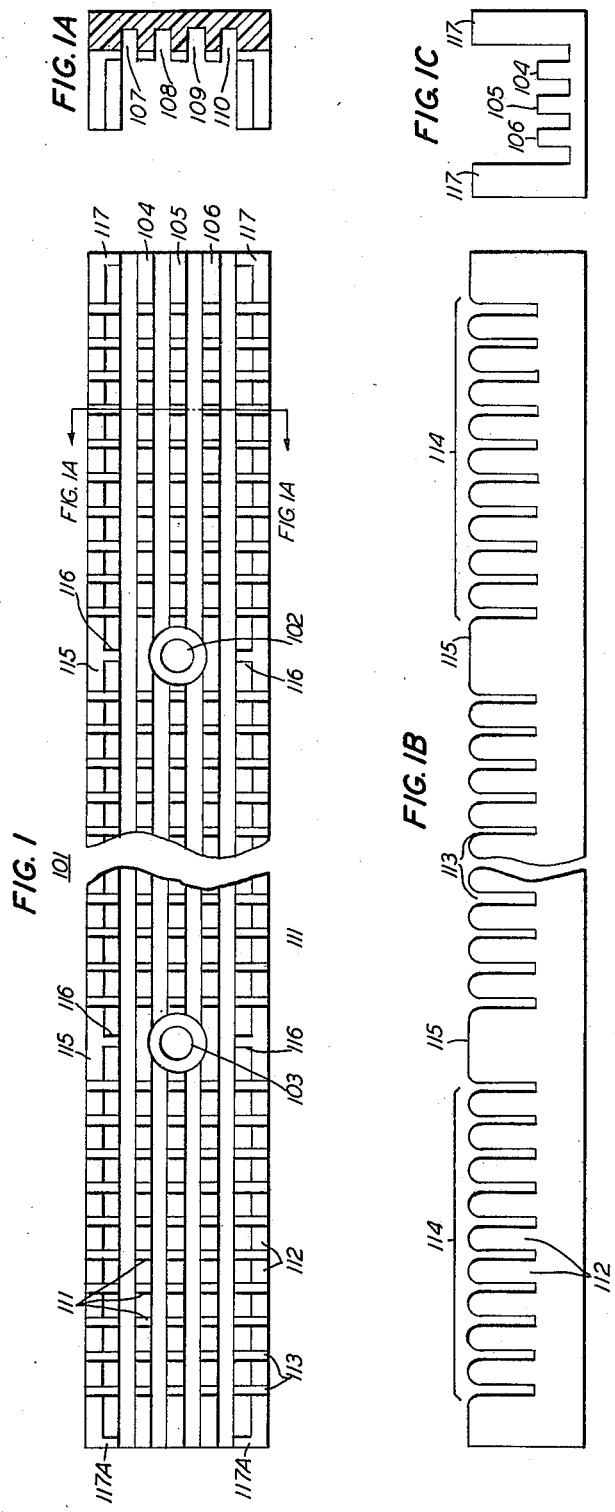
INVENTORS
B. C. ELLIS, JR.
R. B. RAMSEY
R. A. SWANSON
BY
ATTORNEY

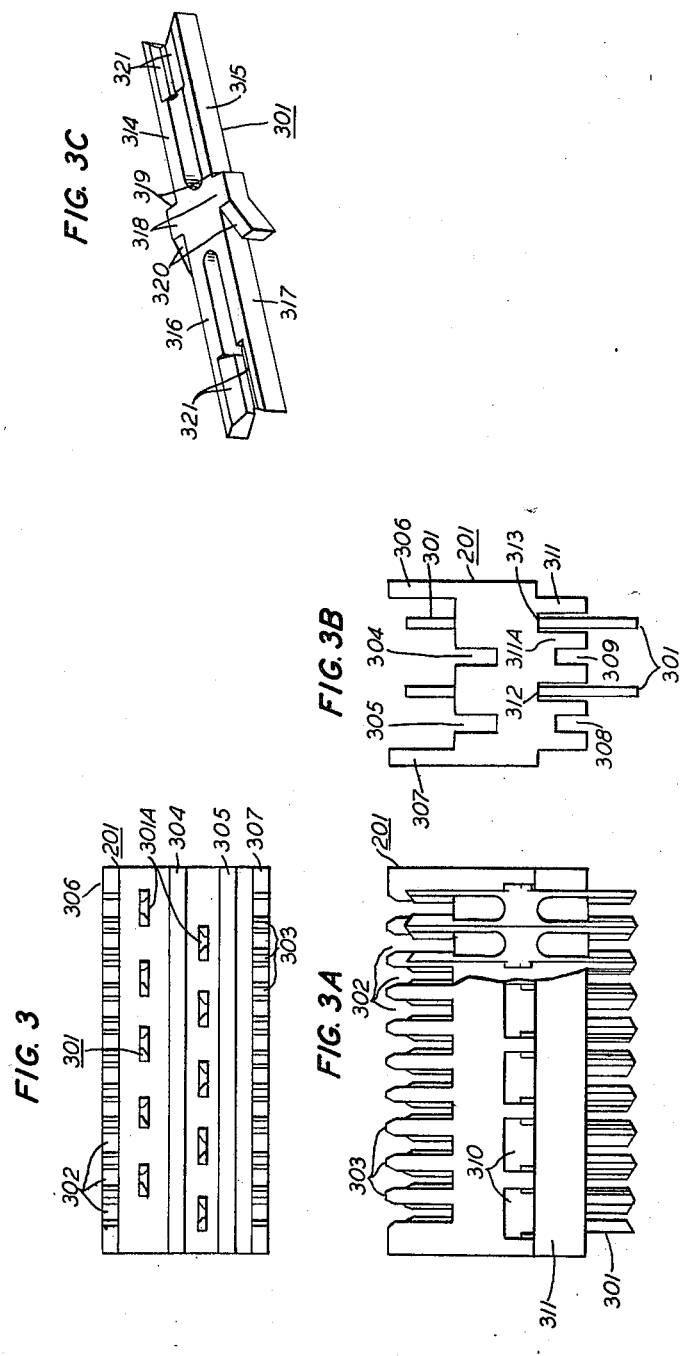

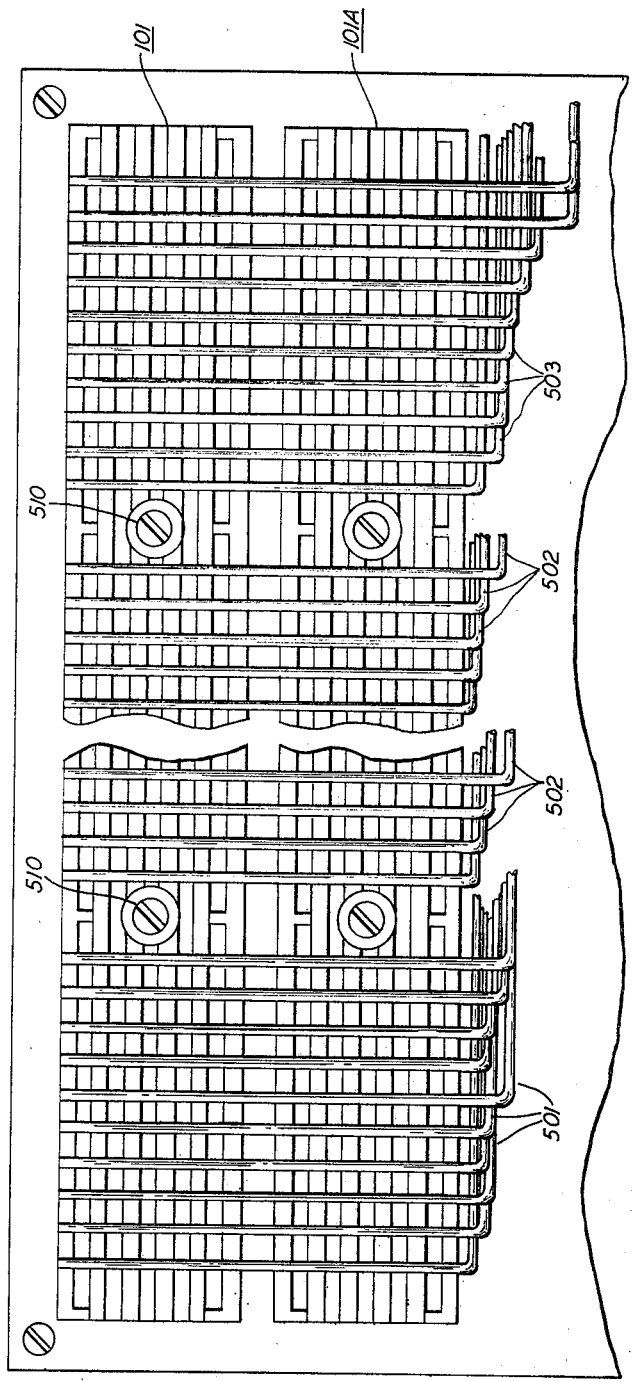

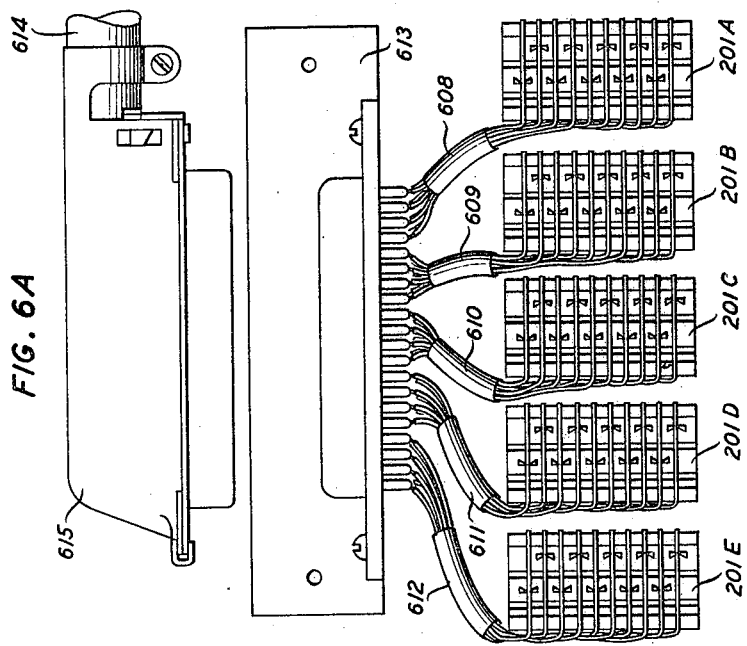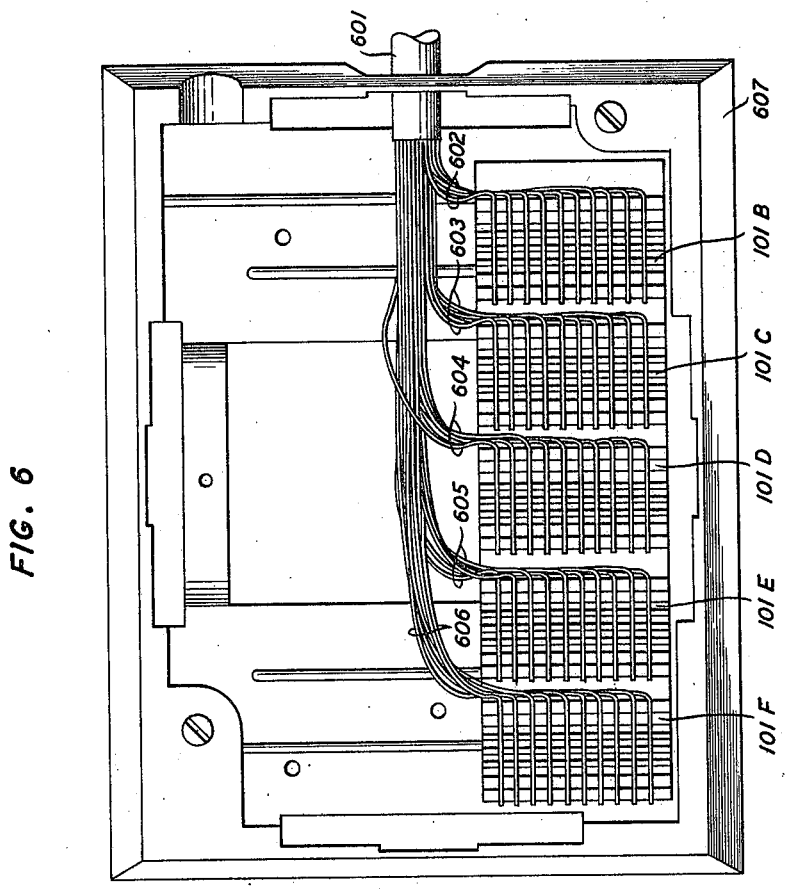

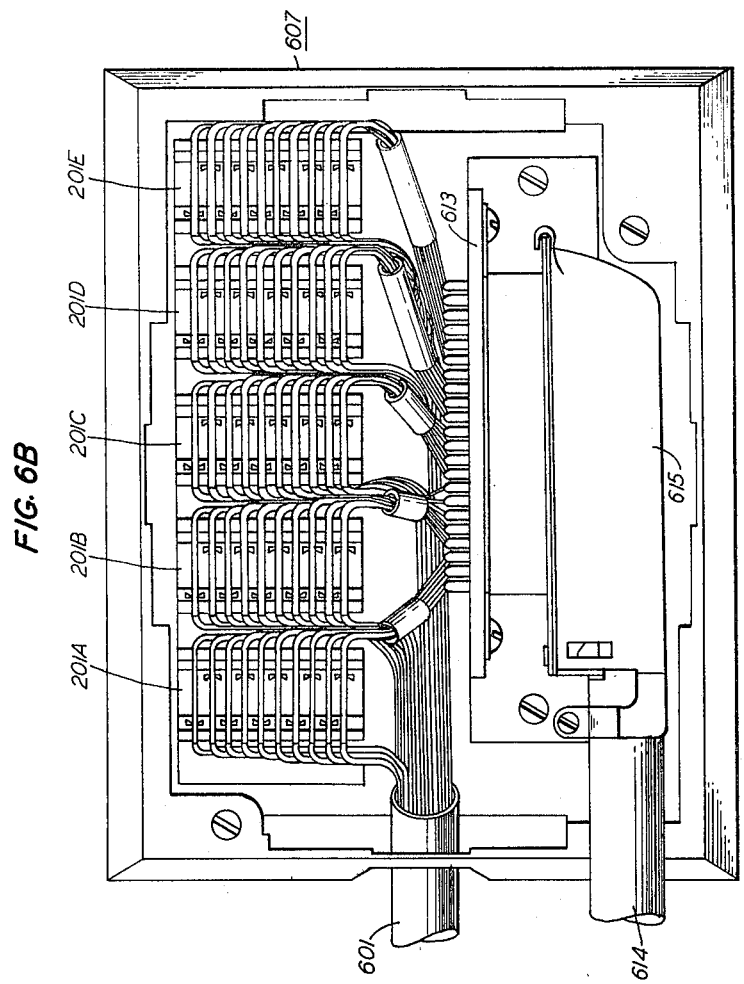

United States Patent Office 3,496,522
Patented Feb. 17, 1970

3,496,522
WIRE CONNECTING BLOCKS
Benjamin C. Ellis, Jr., Baltimore, and Raymond B. Ramsey and Robert A. Swanson, Towson, Md., assignors to Bell Telephone Laboratories, Incorporated, Murray Hill, N.J., a corporation of New York
Filed Apr. 28, 1967, Ser. No. 634,567
Int. Cl. H01r 9/06, 11/20
U.S. Cl. 339—99                                           1 Claim

ABSTRACT OF THE DISCLOSURE

A flat-bottomed U-shaped wire indexing block of rigid plastic material is formed with groups of wire fanning slots in the sidewalls. Longitudinal grooves in the bottom accommodate the ends of insulation-penetrating clips of interfitted connecting block modules. The clips are symmetrical, extending from the top and bottom of the blocks to facilitate piggy-back stacking. The clips have coined edges on their wire contacting surfaces to ensure positive penetration of insulation without unduly heavy clip construction.

BACKGROUND OF THE INVENTION

Field of the invention

This invention relates to wire connecting blocks and more particularly to blocks utilizing insulation-penetrating clips.

Description of the prior art

It has been recognized heretofore that conventional screw type terminal blocks have a number of inherent disadvantages, particularly when utilized to provide connections between the individual wires of a number of communication cables and corresponding terminal equipment for example. These disadvantages which include wasted space and high labor costs have been overcome in part by connecting blocks that employ insulation-pentrating clip-type connectors as shown, for example, by W. Pferd et al. in Patent 3,112,147 issued Nov. 26, 1963, and by A. Logan in Patent 3,234,498 issued Feb. 8, 1966.

Despite these advances in the terminal block art, including the multiple block arrangements shown by S. N. Buchanan and W. S. Pawl in Patent 3,239,796, issued Mar. 8, 1966, a need exists for additional simplification in the block structures in combination with additional flexibility and versatility. Known connecting blocks are either so simplified in construction that their employment is limited to very specific connector needs or so complex that their cost tends to exceed commercial practicality.

SUMMARY OF THE INVENTION

The principles of the invention are based in part on the utilization of a flat-bottomed U-shaped base block of insulating material having opposed wire-fanning slots in the sidewalls thereof. The base block includes no insulation-penetrating means but serves instead as a form of indexing strip that provides for the selective grouping and designation of the individual conductors of a cable. Wires inserted in the fanning slots are stretched across a set of grooves that extend longitudinally along the inner surface of the bottom of the block.

In accordance with the invention individual module connecting blocks are formed in a configuration somewhat similar to the base block, one exception being that each module block has a pair of staggered rows of insulation-penetrating clips with the center portion of each clip being held rigidly by the block. The clips are double ended and each is inserted in a module block so that a first pair of opposing coined edge cantilever beams extends from the top of the block and a second integral pair extends from the bottom of the block. When a module block is positioned so that the bottom protruding clips are in registry with the wires held by the base block, conductive connection is effected between the wires and the clips simply by pressing down on the module block.

In accordance with a feature of the invention, a seated module block interfits snugly with the base block, and the bottom of a second piggy-back module is arranged to interfit with the top of a first module block. Successive piggy-back connections of this type provide sufficient flexibility to ensure meeting a wide variety of interconnection requirements.

Another feature relates to the means by which the clips are held in rigid alignment by the module blocks. Each clip is inserted into an accommodating aperture until a shoulder portion extending from each side of the clip blocks further movement. A pair of spring tab portions integral with the clip shoulder are at first pressed inwardly between accommodating walls of the module block until cutout portions of the walls permit the tabs to spring outwardly. Withdrawal of the clip is thus prevented and the clip remains firmly anchored despite the simplicity of the clip insertion process.

DESCRIPTION OF THE DRAWING

FIG. 1 is a sketch, plan view, of a base connecting block in accordance with the invention;

FIG. 1A is a cross-section view of the block shown in FIG. 1 taken along the line 1A—1A;

FIG. 1B is a side view of the block shown in FIG. 1;

FIG. 1C is an end view of the block shown in FIG. 1;

FIG. 3 is a plan view of the module block shown in FIG. 2;

FIG. 3A is a side view, partially broken away, of the block shown in FIG. 3;

FIG. 3B is an end view of the block shown in FIG. 3;

FIG. 3C is a sketch, shown in perspective, of an insulation-penetrating clip in accordance with the invention;

FIG. 5 is a plan view of a pair of base blocks in accordance with the invention with insulated leads positioned in the fanning slots thereof;

FIG. 6 is a sketch of an arrangement of four base blocks in accordance with the invention with corresponding groups of insulated leads from a cable positioned thereon;

FIG. 6A is a sketch of a cable termination and plug arrangement with each of five groups of individual insulated conductors connected to a corresponding module block in accordance with the invention;

FIG. 6B is a sketch of the cable arrangement shown in FIG. 6B interconnected in accordance with the invention with the cable arrangement shown in FIG. 6A;

DETAILED DESCRIPTION

Figure 4A:
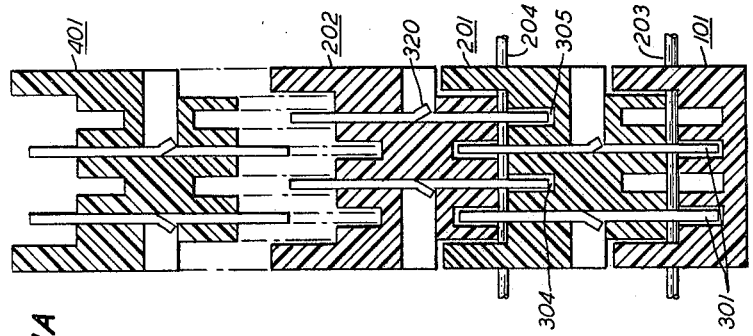
FIG. 4A is an end view, in cross section, of a base block in accordance with the invention interfitted with a pair of module blocks.

The base block 101, shown in FIGS. 1, 1A, 1B and 1C, may advantageously be molded from a suitable plastic material. Each of the two sidewalls 117 includes groups 114 of alternating teeth 112 and wire fanning slots 113, spaced by relatively wide separators 115. The number of slots 113 in a group 114 is arbitrary, but ten slots per group appear to be suitable for a wide range of applications.

The inside bottom portion of the U-shaped block 101 includes slots 107 through 110, between longitudinal ribs 104, 105 and 106. Each wire fanning slot 113 is aligned with a corresponding slot in the opposite one of the sidewalls 117. Each such pair of slots 113 is connected by a corresponding transverse groove or depression 111 which crosses each of the longitudinal ribs 104, 105 and 106. Holes 102 and 103 are positioned in the center portion of the base block 101 to accommodate suitable fasteners 510 (FIG. 5).

As shown in FIG. 5, a pair of base block connectors 101 and 101A may be arranged together so that each of the fanning slot groups 114 accommodates a corresponding group of insulated wires 501, 502 and 503. Each of the wires shown in FIG. 5 is threaded through a pair of the fanning slots 113 and rests in a corresponding one of the grooves 111 so that segments of the wire are positioned across the longitudinal grooves 107 through 110. In accordance with the invention a base block member 101 may be formed with any desired number of slot groups 114, and instead of the combination of a pair of base blocks as shown in FIG. 5, larger multiple groupings may of course be employed.

A second basic feature of the invention involves a module connecting block 201, one form of which is shown in FIGS. 3, 3A and 3B. The module connecting block 201 is in part similar in construction to the base block shown in FIGS. 1, 1A, 1B and 1C, to the extent that it includes a substantially U-shaped top portion with longitudinal side walls 306 and 307 formed by alternating teeth 303 and wire fanning slots 302. In accordance with the invention the number of pairs of fanning slots 302 in the module block 201 advantageously corresponds to the number of pairs of fanning slots 113 in each of the fanning slot groups 114 of the base block member 101. The top portion of the module block 201 includes a single pair of longitudinal grooves 304 and 305. The bottom portion of the block includes a similar pair of grooves 308 and 309 and a somewhat deeper pair of grooves 312 and 313. In accordance with the invention, the top and bottom portions of the module block 201 are connected by vertical apertures 301A, rectangular in cross section as shown in FIG. 3, which are placed in a pair of horizontally staggered rows. Further in accordance with the invention, an insulation-piercing clip 301, as shown in FIG. 3C, is inserted from the bottom portion of the block 201 into each aperture 301A, guided by accommodating wall portions such as 311 and 311A.

The clip 301 is uniquely constructed to include a first pair of cantilever beams 314 and 315 at one end and a second integral pair of cantilever beams 316 and 317 at the opposite end. Each interior surface of each of the cantilever beams 314 through 317 is coined or tapered inwardly to form an insulation-piercing edge 321. As a result, insulation-piercing is effected by a combined cutting and crushing action in contrast to prior art clips which rely almost wholly on insulation crushing. Consequently, the size and strength of the cantilever beams 314 through 317 may be substantially reduced as compared to insulation crushing cantilever beams employed in the prior art.

The center portion of the clip 301 comprises a pair of integral projecting members 318 each of which includes a shoulder portion 319 and a spring tab 320. As the clip 301 is forced upwardly into an accommodating aperture 301A the guiding sidewalls 311A and 311 act to compress the spring tabs 320 inwardly. At the point when the upward progress of the clip 301 is stopped by the action of the shoulders 319 impinging against the bottom portion of the slot 313 which coincides with the entrance to the bottom of the corresponding aperture 301A, the spring tabs 320 are in registry with one of the corresponding window apertures 310 (shown in FIG. 3A). The tabs 320 are thus permitted to spring outwardly at which point the end portion of each tab 320 bears against the top portion of the wall member 311, as best shown in FIG. 4A. As a result, each clip 301 becomes securely locked in one of its corresponding apertures 301 inasmuch as the shoulder portions 319 preclude deeper insertion of the clip and the tabs 320 inhibit withdrawal.

Figure 2:
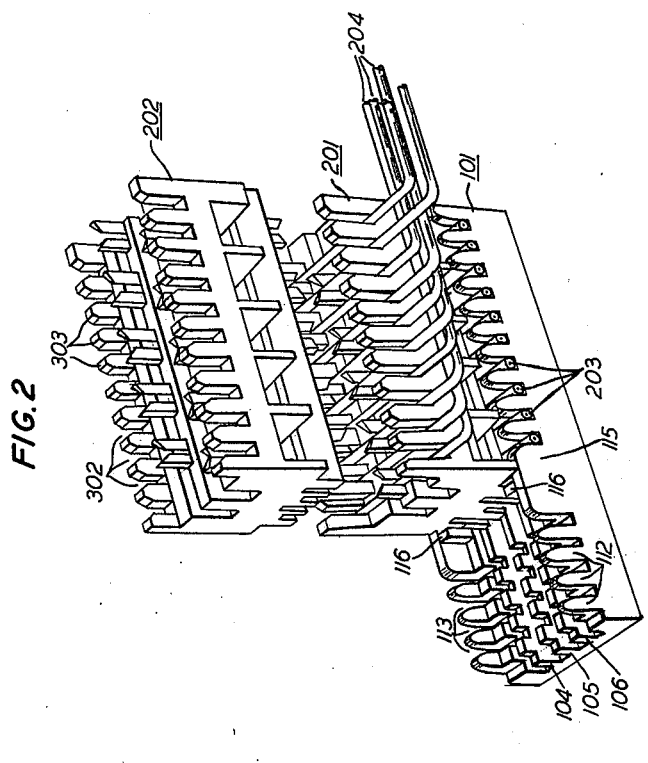
FIG. 2 is a sketch, shown in perspective of a module connecting block in accordance with the invention interfitted with a base block of the type shown in FIG. 1.

FIG. 2 shows the manner in which a module block 201 may be interfitted with a base block 101 in accordance with the invention in order to interconnect a first group of insulated wires 203 with a second group of insulated wires 204. As shown, the wires 203 are positioned in accommodating fanning slots 113 in the fashion described above. Additionally, the module block 201 has been positioned by tab guides 116 in order to place the lower insulation-piercing portion of each of the clips 301 in registry with a corresponding portion of one of the leads 203. The interfitting of module block 201 and base block 101 may be completed and conductive contact between each of the clips 301 and a corresponding one of the leads 203 may be effected simply by pressing down on the top portion of the block 201. Such pressure may advantageously be applied by the use of a seating tool 801 of the type shown in FIG. 7. The tool 801 comprises a handle portion 802 and a head portion 803. The head portion 803 includes alternating ribs 804 and grooves 805 which are designed to interfit with the top portion of the module block 201 in the manner illustrated by FIG. 8.

Figure 7:
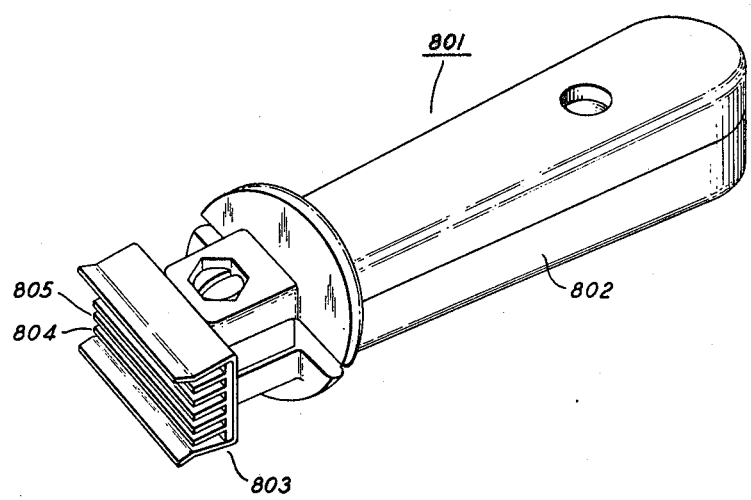
FIG. 7 is a sketch, shown in perspective, of a tool in accordance with the invention which may advantageously be employed for seating a module block.
Figure 8:
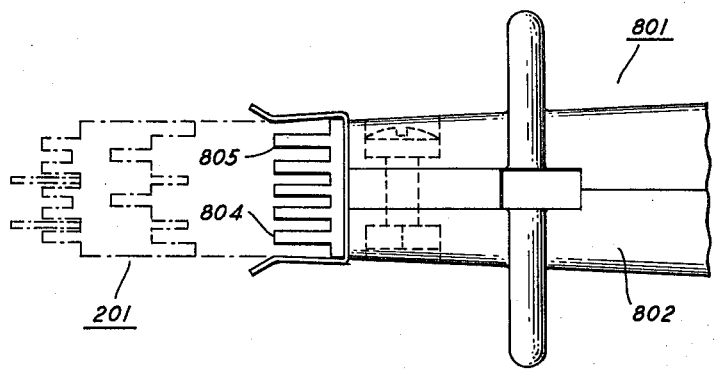
FIG. 8 is a sketch of the tool shown in FIG. 7 illustrating its interfitting relation with the top portion of a module block.

The next step in completing the interconnection between the wires 203 and the wires 204 is to place each of the wires 204 in position through a corresponding pair of the fanning slots 302. As shown, each of the wires 204 is designed to be contacted by only a single one of the clips 301. The leads 204 may be forced into conductive contact with corresponding ones of the clips 301 simply by pressing down on the lead until it spreads the cantilever beams. Once again this pressure may advantageously be applied through the use of the seating tool 801 (FIG. 7). If interconnection with a third group of wires is desired, a second module block 202 may be employed in the manner indicated in FIGS. 2 and 4A. Still another group of wires may be added to the connection by the piggyback stacking of an additional module block 401 as shown in FIG. 4A.

Figure 4:
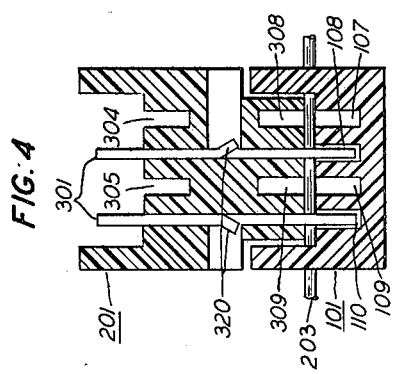
FIG. 4 is an end view, in cross section, of a base block and a module block interfitted in accordance with the invention.

The manner in which the bottom portion of a module block 201 interfits with the top portion of a base block 101 is shown with particular clarity in FIG. 4. Specifically, when fully interfitted, the longitudinal grooves 108 and 110 accommodate the lower insulation-piercing portions of the clips 301. Similarly, the upper portion of the module block 201 interfits the lower portion of a similar module block 202 in that the lower insulation-piercing portions of the clips 301 are accommodated by the longitudinal grooves 304 and 305 as shown in FIG. 4A.

The versatility of the principles of the invention in providing for cable interconnections is best illustrated by the sketches of FIGS. 6, 6A and 6B. In FIG. 6 a first cable 601 including conductor groups 602 through 606 is positioned in a connection box 607 which supports a group of five base blocks 101B through 101F. As indicated, each of the base blocks 101B through 101F includes only a single group 114 of ten pairs of wire fanning slots. Each of the wire groups 602 through 606 is positioned in accordance with the invention in a corresponding one of the base blocks 101B through 101F.

In FIG. 6A each of five groups of insulated leads 608 through 612 is connected between a conventional connecting block 613 and a respective one of the module blocks 201A through 201E. A plug 615, terminating cable 614, is designed for interfitting with the connecting block 613 in the manner shown in FIG. 6B. Additionally, as shown in FIG. 6B, each of the module blocks 201A through 201E has been interfitted with a corresponding one of the base blocks 101B through 101F to complete connection between corresponding ones of the leads in cables 601 and 614.

It is to be understood that the embodiments described herein are merely illustrative of the principles of the invention. Various modifications thereto may be effected by persons skilled in the art without departing from the spirit and scope of the invention.

What is claimed is:

1. Apparatus for connecting a first group of insulated wires to a second group of insulated wires comprising, in combination, a U-shaped connecting strip having pairs of vertical wire fanning slots, a plurality of longitudinal grooves on the inside bottom portion of said U, whereby insulated wires of said first group held in position by said vertical slots are stretched transversely across said longitudinal grooves, a module connecting block of a substantially U-shaped configuration having wire fanning vertical slots in the sidewalls thereof substantially identical to said first named slots, a plurality of double ended insulation-penetrating clips mounted in said module, each of said clips having a first insulation-piercing portion aligned with only a single respective one of said pairs of fanning slots and a second insulating-piercing portion extending below the bottom portion of said module, means for aligning said module with a corresponding portion of said connecting strip, whereby upon forcing said module downwardly after alignment with said connecting strip each of said second insulation-piercing portions makes electrically conductive contact with a corresponding one of said wires of said first group, the lower portion of each of said second insulation-piercing portions being accommodated by a corresponding one of said longitudinal grooves, and whereby each of said wires in said second group may be inserted in a respective one of said first insulation-piercing portions and in a corresponding pair of said slots in said module block whereupon an electrically conductive connection is made between each of said last named wires and a single corresponding one of said first insulation-piercing portions, each of said clips including first and second pairs of cantilever beams coined on the inner edges thereof, corresponding pairs of said inner edges forming said first and second insulation-piercing portions, each of said module blocks including a plurality of vertically disposed apertures for accommodating said clips, each of said clips including a center portion having shoulder portions extending beyond the width of said cantilever beam portions and beyond the width of said apertures thereby to preclude insertion of said clips in said apertures beyond said shoulder portion, each of said shoulder portions including at least one spring tab portion, said module block further including a pair of spaced wall portions for guiding said clips for insertion in said apertures, one of said wall portions having windows therein positioned to expose said shoulder portions of said clips when said clips are inserted in said aperture, said tabs being constrained between said wall portions during the insertion of said clips therebetween, and said tabs being free to spring outwardly to bear against an inside edge of said windows thereby locking said clips in position and preventing the withdrawal of said clips from said accommodating apertures.

References Cited

UNITED STATES PATENTS

| 2,333,266 | 11/1943 | Miller | 339—95 |
| 3,118,715 | 1/1964 | Potruch | 339—98 |
| 3,178,673 | 4/1965 | Krehbiel. | |
| 3,189,863 | 6/1965 | Leach | 339—99 |
| 3,239,796 | 3/1966 | Buchanan et al. | 339—97 |
| 3,327,284 | 6/1967 | Crimmins | 339—276 |

MARVIN A. CHAMPION, Primary Examiner

JOSEPH H. McGLYNN, Assistant Examiner

U.S. Cl. X.R.

339—217